United States Patent
Sauer et al.

(10) Patent No.: US 11,896,922 B2
(45) Date of Patent: *Feb. 13, 2024

(54) VACUUM CLEANER FILTER BAG WITH POWDERY AND/OR FIBROUS RECYCLED MATERIAL

(71) Applicant: Eurofilters N.V., Overpelt (BE)

(72) Inventors: Ralf Sauer, Overpelt (BE); Jan Schultink, Overpelt (BE)

(73) Assignee: EUROFILTERS N.V., Overpelt (BE)

( * ) Notice: Subject to any disclaimer, the term of this patent is extended or adjusted under 35 U.S.C. 154(b) by 147 days.

This patent is subject to a terminal disclaimer.

(21) Appl. No.: 16/084,917

(22) PCT Filed: Mar. 13, 2017

(86) PCT No.: PCT/EP2017/055791
§ 371 (c)(1),
(2) Date: Sep. 13, 2018

(87) PCT Pub. No.: WO2017/157827
PCT Pub. Date: Sep. 21, 2017

(65) Prior Publication Data
US 2019/0075988 A1   Mar. 14, 2019

(30) Foreign Application Priority Data

Mar. 17, 2016 (EP) .................................... 16160921
Mar. 17, 2016 (EP) .................................... 16160922
(Continued)

(51) Int. Cl.
*A47L 9/14*   (2006.01)
*B01D 39/16*   (2006.01)
*B01D 39/18*   (2006.01)

(52) U.S. Cl.
CPC .............. *B01D 39/163* (2013.01); *A47L 9/14* (2013.01); *B01D 39/1615* (2013.01);
(Continued)

(58) Field of Classification Search
CPC .................. B01D 39/18; B01D 39/163; B01D 2239/065; B01D 2239/0283; A47L 9/14; D04H 1/42
(Continued)

(56) References Cited

U.S. PATENT DOCUMENTS 2,251,252 A   7/1941   Lovell
4,154,885 A   5/1979   Tecl et al.
(Continued)

FOREIGN PATENT DOCUMENTS

CN   101670209 A   3/2010
CN   101684634 A   3/2010
(Continued)

OTHER PUBLICATIONS

International Search Report dated May 26, 2017 for International Application No. PCT/EP2017/055791.
(Continued)

*Primary Examiner* — Akash K Varma
(74) *Attorney, Agent, or Firm* — Crowell & Moring LLP

(57) ABSTRACT

The invention provides a vacuum cleaner filter bag comprising a wall of an air-permeable material enclosing an interior and an inlet opening introduced into the wall, wherein the air-permeable material comprises at least one layer of a nonwoven fabric, which comprises powdery and/or fibrous recycled material from the production of textiles, in particular cotton textiles, wherein the at least one layer of the nonwoven fabric comprises powdery and/or fibrous recycled material having a density of 0.005 g/cm$^3$ to 0.03 g/cm$^3$, in particular of 0.007 g/cm$^3$ to 0.02 g/cm$^3$.

17 Claims, 1 Drawing Sheet

(30) Foreign Application Priority Data

Jul. 11, 2016 (EP) ..................................... 16178839
Oct. 6, 2016 (EP) ..................................... 16192651

(52) U.S. Cl.
CPC ......... *B01D 39/1646* (2013.01); *B01D 39/18* (2013.01); *B01D 2239/0283* (2013.01); *B01D 2239/06* (2013.01); *B01D 2239/065* (2013.01); *B01D 2239/0618* (2013.01); *B01D 2239/086* (2013.01)

(58) Field of Classification Search
USPC .......................................................... 55/382
See application file for complete search history.

(56) References Cited

U.S. PATENT DOCUMENTS

| | | | |
|---|---|---|---|
| 4,547,420 A | 10/1985 | Krueger et al. | |
| 5,549,957 A | 8/1996 | Negola et al. | |
| 6,156,086 A | 12/2000 | Zhang | |
| 6,171,369 B1 * | 1/2001 | Schultink | B32B 29/02 95/57 |
| 11,504,662 B2 | 11/2022 | Sauer et al. | |
| 11,602,252 B2 | 3/2023 | Schultink et al. | |
| 2002/0042236 A1 | 4/2002 | Nobuhara et al. | |
| 2004/0132376 A1 | 7/2004 | Haworth | |
| 2004/0211160 A1 | 10/2004 | Rammig et al. | |
| 2007/0130894 A1 | 6/2007 | Schultink et al. | |
| 2007/0175817 A1 | 8/2007 | Goldman | |
| 2009/0031683 A1 * | 2/2009 | Schultink | A47L 9/14 55/382 |
| 2009/0223190 A1 * | 9/2009 | Nauta | D04H 1/64 55/524 |
| 2010/0029161 A1 | 2/2010 | Pourdeyhimi | |
| 2011/0030557 A1 * | 2/2011 | Brownstein | D04H 1/4291 55/501 |
| 2012/0131890 A1 * | 5/2012 | Schultink | A47L 9/14 55/368 |
| 2012/0211625 A1 * | 8/2012 | Schultink | A47L 9/1445 248/311.2 |
| 2012/0234748 A1 | 9/2012 | Little et al. | |
| 2013/0047856 A1 | 2/2013 | Takeuchi | |
| 2014/0120322 A1 | 5/2014 | Fu et al. | |
| 2014/0278142 A1 | 9/2014 | Danes et al. | |
| 2015/0017865 A1 | 1/2015 | Schröer et al. | |
| 2019/0075987 A1 | 3/2019 | Sauer et al. | |
| 2019/0075988 A1 | 3/2019 | Sauer et al. | |
| 2019/0076766 A1 | 3/2019 | Sauer et al. | |
| 2019/0082913 A1 | 3/2019 | Schultink et al. | |

FOREIGN PATENT DOCUMENTS

| | | |
|---|---|---|
| CN | 101747596 A | 6/2010 |
| CN | 103147163 A | 6/2013 |
| CN | 103654623 A | 3/2014 |
| CN | 105120977 A | 12/2015 |
| CN | 204973320 U | 1/2016 |
| CN | 105342526 A | 2/2016 |
| CN | 105999856 A | 10/2016 |
| DE | 1 628 582 | 2/1968 |
| DE | 90 16 939 U1 | 5/1991 |
| DE | 44 15 350 A1 | 11/1995 |
| DE | 296 15 163 U1 | 1/1997 |
| DE | 2001 0049 U1 | 10/2000 |
| DE | 199 19 809 A1 | 11/2000 |
| DE | 199 48 909 A1 | 4/2001 |
| DE | 102 03 460 A1 | 8/2002 |
| DE | 10221694 A1 | 12/2003 |
| DE | 20 2006 020 047 U1 | 10/2007 |
| DE | 10 2006 037 456 A1 | 2/2008 |
| DE | 10 2006 055 890 A1 | 5/2008 |
| DE | 20 2008 003 248 U1 | 6/2008 |
| DE | 20 2008 005 050 U1 | 7/2008 |
| DE | 20 2008 004 733 U1 | 11/2008 |
| DE | 10 2008 046 200 A1 | 4/2009 |
| DE | 202008016836 U1 | 4/2009 |
| DE | 10 2007 062 028 A1 | 6/2009 |
| DE | 20 2008 006 904 U1 | 11/2009 |
| DE | 10 2008 041 227 A1 | 2/2010 |
| DE | 20 2008 018 054 U1 | 6/2011 |
| DE | 10 2010 060 175 A1 | 3/2012 |
| DE | 10 2011 008 117 A1 | 4/2012 |
| DE | 10 2010 060 353 A1 | 5/2012 |
| DE | 10 2011 105 384 A1 | 12/2012 |
| DE | 20 2013 001 096 U1 | 4/2013 |
| DE | 20 2011 052 208 U1 | 5/2013 |
| DE | 20 2013 100 862 U1 | 5/2013 |
| DE | 10 2012 012 999 A1 | 7/2013 |
| DE | 20 2013 103 508 U1 | 10/2013 |
| DE | 102013014920 A1 | 1/2015 |
| DE | 10 2014 109 596 A1 | 2/2015 |
| DE | 20 2015 101 218 U1 | 5/2015 |
| DE | 20 2014 100 563 U1 | 6/2015 |
| EP | 0 758 209 A1 | 11/1995 |
| EP | 0 960 645 A2 | 12/1999 |
| EP | 0960645 A2 | 12/1999 |
| EP | 1 198 280 A1 | 1/2001 |
| EP | 1 137 360 A1 | 4/2001 |
| EP | 1198280 A1 | 4/2002 |
| EP | 1 254 693 A2 | 11/2002 |
| EP | 1258277 A1 | 11/2002 |
| EP | 1 480 545 A1 | 9/2003 |
| EP | 10191748 B1 | 6/2005 |
| EP | 1402934 B1 | 5/2007 |
| EP | 1 795 247 A1 | 6/2007 |
| EP | 1 795 427 A1 | 6/2007 |
| EP | 1917895 B1 | 5/2008 |
| EP | 2004303 B1 | 12/2008 |
| EP | 2 011 556 A1 | 1/2009 |
| EP | 2 044 874 A2 | 4/2009 |
| EP | 2 123 206 A1 | 11/2009 |
| EP | 2161374 A1 | 3/2010 |
| EP | 2 263 507 A1 | 12/2010 |
| EP | 2 263 508 A1 | 12/2010 |
| EP | 2 442 703 A1 | 12/2010 |
| EP | 2 301 404 A2 | 3/2011 |
| EP | 2 433 695 A1 | 3/2012 |
| EP | 2826895 A1 | 1/2015 |
| EP | 3 219 373 A1 | 9/2017 |
| EP | 3 219 374 A1 | 9/2017 |
| EP | 3 219 375 A1 | 9/2017 |
| EP | 3305155 A1 | 4/2018 |
| EP | 3666360 B1 | 9/2021 |
| FR | 2 721 188 A1 | 12/1995 |
| JP | H07251015 A | 10/1995 |
| JP | H09220419 A | 8/1997 |
| JP | H09276637 A | 10/1997 |
| JP | 2000328369 A | 11/2000 |
| JP | 200117282 A | 6/2001 |
| JP | 2001327814 A | 11/2003 |
| JP | 2003334412 A | 11/2003 |
| JP | 2004131862 A | 4/2004 |
| JP | 2005060886 A | 3/2005 |
| JP | 2006328600 A | 12/2006 |
| JP | 2007254908 A | 10/2007 |
| KR | 20120070858 A | 7/2012 |
| KR | 20120133548 A | 12/2012 |
| KR | 20170135833 A | 12/2017 |
| WO | WO 1993/1340 A1 | 7/1993 |
| WO | WO 1999/58041 A1 | 11/1999 |
| WO | WO 01/003802 A1 | 1/2001 |
| WO | WO 03/073903 A1 | 9/2003 |
| WO | WO 2006/044018 A1 | 4/2006 |
| WO | WO 07/121979 A1 | 11/2007 |
| WO | WO 11/047764 A1 | 4/2011 |
| WO | WO 11/057641 A1 | 5/2011 |
| WO | WO 2011/057651 A1 | 5/2011 |
| WO | WO 2012/025451 A1 | 3/2012 |
| WO | WO 13/106392 A2 | 7/2013 |
| WO | WO 2014/074398 A2 | 5/2014 |

(56) References Cited

FOREIGN PATENT DOCUMENTS

| WO | WO2014074398 A2 | 5/2014 |
|----|----|----|
| WO | WO 2014/145804 A1 | 9/2014 |

OTHER PUBLICATIONS

Lueger; Encyclopedia of the entire technology: Staple Fiber 600 (Neuschappe); downloaded from the Internet on Aug. 29, 2019 at http://www.zeno.org/Lueger-1904/A/Stapelfaser; 1920; including English translation.

East Bavarian Technical College: construction course in plastics technology East Bavarian Technical University Amberg-Weiden; Study content for the course of plastics technology; downloaded from the internet on May 23, 2019 at https://www.oth-aw.de/studiengaenge-und-bildungsangbote/studienangebote/bachelor-studiengaenge/kunststofftechnik/aufbau/; 10 pages including English translation.

European Standard No. DIN EN 15347: Plastics, Recycled Plastics, Characterisation of Plastics Wastes, English Version; ICS 13.030.50; 83.080.01; Feb. 2008; 12 pages.

Shen, Li et al.; "Open-loop recycling: A LCA case study of PET bottle-to-fibre recycling"; Resources, Conservation and Recycling, vol. 55; Nov. 1, 2010; pp. 34-52.

Chinese Office Action dated Jun. 1, 2020 on CN Appl. No. 201780030206.0 (Translation attached).

European Standard No. DIN EN 15342: Plastics, Recycled Plastics, "Characterization of Polystyrene (PS) Recyclates," German Version 2007; ICS 13.030.50; Dec. 2007; 28 pages. (Translation attached).

European Standard No. DIN EN 15344: Plastics, Recycled Plastics, "Characterization of Polyethylene (PE) Recyclates," German Version 2007; ICS 13.030.50; 83.080.20; Dec. 2007; 34 pages. (Translation attached).

European Standard No. DIN EN 15345: Plastics, Recycled Plastics, "Characterization of Polypropylene (PP) Recyclates," German Version 2007; ICS 13.030.50; 83.080.20; Dec. 2007; 28 pages. (Translation attached).

European Standard No. DIN EN 15346: Plastics, Recycled Plastics, "Characterization of Poly (vinyl chloride) (PVC); Recyclates," German Version 2014; ICS 13.030.50; 83.080.20; Nov. 2014; 56 pages. (Translation attached).

European Standard No. DIN EN 15353: Plastics, Recycled Plastics, "Guidelines for the Development of Standards Relating for Recycled Plastics"; German Version CEN/TR 15353:2007; ICS 01.120; 13.030.50; 83.080.01; (Feb. 2007; 25 pages. (Translation attached).

European Standard DIN EN 15347:2007 (Translation attached).

Ostbayerische Technische Hochschule Amberg-Weiden, "Studieninhalt Studiengang Kunststofftechnik", [gefunded09.09.2020] Fundstelle: [http://www.oth-aw.de/studiengaenge-und-bildungsangbote/studienangebote/bachelor-studiengaenge/kunststofftechnik/studineinhalte/] (Translation attached).

Gutachten zur Auswertung von Recyclingstandards von Prof. Dr.-Ing. H.-J. Endres (May 27, 2020) (Translation attached).

"*Nonwoven Fabric Production Technology*" China Textile University Press, 1st edition, China National Intellectual Property Administration, Jun. 1998, pp. 64-65.

Second Office Action dated Jan. 28, 2021, in corresponding Chinese Application No. 2017-80030206.0 (15 pages) (English translation attached).

DIN EN 15347, 2007, Feb. 2008.

Li, Shen et al., "Open-loop recycling: A LCA case study of PET bottle-to-fibre recycling," Resources, Conservation and Recycling, Jun. 30, 2010, 19 pages.

DIN EN 15342, Feb. 2008.

DIN EN 15345, Feb. 2008.

DIN EN 15344, Feb. 2008.

DIN EN 15346, Jan. 2015.

DIN-Fachbericht CEN/TR 15353, Apr. 2007.

Mitteiluna aema.B Reael 71 (3) EPU.

Google, "Google Abfrage RPET DIN EN 15353:2007", [gefunden27.07.2021].

Pfaendner, Rudolf et al., "Recycling and Restabilization of Polymers for High Quality Applications—An Overview," Die Angewandte Makromolekulare Chemie, vol. 232, No. 4140, 1995.

Pospisil, Jan et al., "Upgrading of recycled plastics by restabilization—an overview," Polymer Dearadation and Stability, 1995.

La Mantia, Francesco Paolo et al., "The Role of Additives in the Recycling of Polymers," Macromol. Symp., vol. 135, 1998.

Pospisil, Jan et al., "The Origin and Role of Structural Imhomogenitties and Impurities in Material Recycling of Plastics," Macromol. Symp., vol. 135, 1998.

Jannsson, Anna et al., "Chemical degradation of a polypropylene material exposed to simulated recycling" Polymer Degradation and Stability, vol. 84, 2004.

Hinsken, Hans et al., "Degradation of Polyolefins during Melt Processing," Polymer Degradation and Stability, vol. 34, 1991.

Stangenberg, F. et al., "Quality Assessments of Recycled Plastics by Spectroscopy and Chromatography," Chromatographia, vol. 59, 2004.

Wanderson, Romao et al., "Distinguishing between virgin and post-consumption bottle-grade poly (ethylene terephthalate) using thermal properties," Polymer Testing, vol. 29, 2010.

Mansor, Muhd Ridzuan et al., "Thermal and Mechanical Behaviour of Recycled Polypropylene/Polyethylene Blends of Rejected-Unused Disposable Diapers," Journal of Advanced Manufacturing Technology, Jan. 3, 2020.

Curtzwiler, Greg W., "Certification markers for empirical quantification of post-consumer recycled content in extruded polyethylene film" Polymer Testing, vol. 65, 2018.

Verordnung (EG) Nr. 282/2008 Der Kommission.

Wissenschaftliches Gutachten, 1992, 1 page, Berlin.

Albrecht, W. et al., "Nonwoven Fabrics" WILEY-VCH, 2003 ISBN: 3-527-30406-1.

Hutten, Irvin M., "Handbook of Nonwoven Filter Media" Buttenworth-Heinemann, 2016 ISBN: 978-0-08-098301-1.

Erganzende Stellunanahme zu dem Gutachten, Herrn Dr. Ina. Guru Geertz.

Gutachten Prof. Dr.-Ina. H.J. Endres vom May 27, 2020.

Erganzende wissenschaftliche Stellungnahme Prof. Dr.-Ing. H. J. Endres vom Aug. 3, 2021.

Textile Science and Clothing Technoloav—ISSN 2197-9863.

Jan Dantz, "Begründung," 19 pages.

Einspruch gegen ein europaisches Patent regarding EP16160922.7 dated May 8, 2019, 6 pages.

Opposition Filing Documents EP 16160922.7, EP, Eurofilters N.V.

International Search Report and Written Opinion of the International Search Authority dated May 12, 2017 in International Application No. PCT/EP2017/055781 (English and German Languages) (9 pages).

International Search Report and Written Opinion of the International Search Authority dated Jul. 14, 2017 in International Application No. PCT/EP2017/056128 (English and German Languages) (14 pages).

First Office Action in Corresponding Chinese Application No. 201780018022.2, dated Jun. 2, 2020 (English Translation) (15 pages).

First Office Action in corresponding Chinese Application No. 201780017424.0 dated Jun. 24, 2020 (23 pages) (English Translation).

Second Office Action in corresponding Chinese Application No. 2017-80017424.0 dated Mar. 10, 2021 (19 pages) (English translation).

Third Office action in Corresponding Chinese Application No. 201780017424.0 dated Nov. 24, 2021 (19 pages) (English Translation).

Opinion of Dr. G. Geertz submitted in an opposition proceeding of EP Patent No. 3219376 (dated May 21, 2021) (17 pages).

Romão et al., "Distinguishing between virgin and post-consumption bottle-grade poly(ethylene terephthalate) using thermal properties," Polymer Testing 29 (2010) 879-885 (May 18, 2010) (7 pages).

Notice of Opposition filed in EP counterpart Application No. EP16160922.7 dated Feb. 7, 2020 (10 pages).

(56) References Cited

OTHER PUBLICATIONS

Examination Report No. 1 dated Feb. 19, 2021, in corresponding Australian Application No. 2017232262 (5 pages).
Examination Report in Australian Serial No. 2017232261, dated Jul. 17, 2019 (3 pages).
International Search Report and Written Opinion of the International Search Authority dated Sep. 1, 2017 in International Application No. PCT/EP2017/056127 (English and German Languages) (15 pages).
International Preliminary Report on Patentability in European Application Serial No. PCT/EP2017/056127 dated Sep. 27, 2018 with English Translation (20 pages).
Russell, "Handbook of Nonwovens", Woodhead publishing textiled Chapter 4.10.1, Jan. 8, 1993 (4 pages).
Office Action in European Application Serial No. 17,712,067.2 dated Jul. 12, 2019 (German) (4 pages).
Notice of Opposition filed in EP counterpart Application No. EP16192650.6 dated May 22, 2019 with English translation (42 pages).
Notice of Opposition filed in EP counterpart Application No. EP 20154822.9 dated Sep. 15, 2021 (8 pages).
Response to Notice of Opposition filed in EP Application Serial No. 20154822.9 dated Jun. 14, 2022 (27 pages).
Qin, et al. "Studies on Recycled Polyester", Textile Science and Clothing Technology, 2019 (39 pages).
Office Action in Chinese Application No. 202111177293.7 dated Aug. 9, 2022 (with English translation) (10 pages).

* cited by examiner

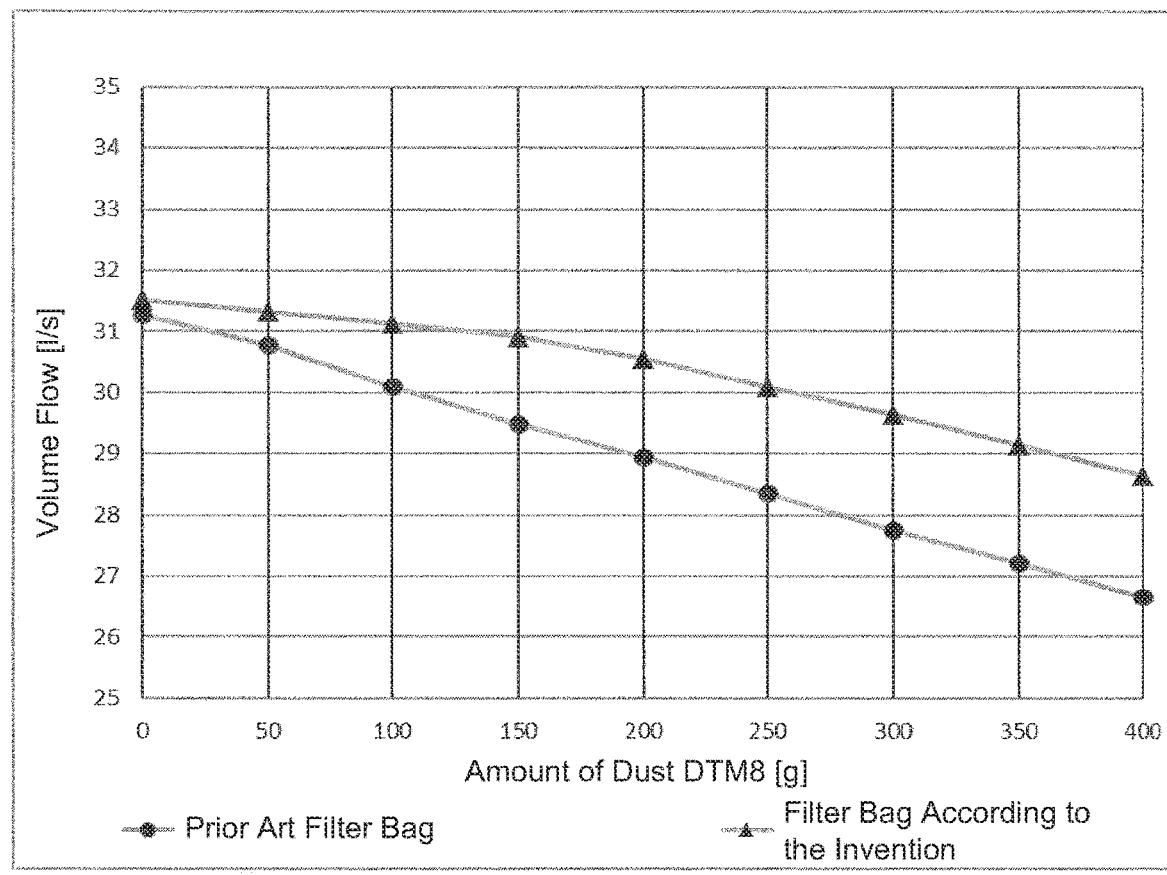

VACUUM CLEANER FILTER BAG WITH POWDERY AND/OR FIBROUS RECYCLED MATERIAL

This application claims the benefit under 35 U.S.C. § 371 of International Application No. PCT/EP2017/055791, filed Mar. 13, 2017, which claims the priority of European Patent Application No. 16160921.9, filed Mar. 17, 2016; European Patent Application No. 16160922.7, filed Mar. 17, 2016; European Patent Application No. 16178839.3, filed Jul. 11, 2016; and European Patent Application No. 16192651.4, filed Oct. 6, 2016, which are incorporated by reference herein in their entirety.

The present invention relates to vacuum cleaner filter bags made of waste products from the textile industry. In addition, possible uses of waste products from the textile industry for vacuum cleaner filter bags are specified.

Filter bags made of nonwoven fabrics have virtually completely replaced paper filter bags in the last 10 years due to their significantly better performance characteristics. In particular, the separation efficiency, clogging tendency and mechanical strength were continuously improved. The nonwoven fabrics used for this purpose are usually made of thermoplastics, in particular polypropylene (PP) and/or polyester (PET).

Even though there is still a need for improving these characteristics, it is nevertheless noticeable that the high costs of complex filter embodiments are becoming less and less accepted by the end customer.

Moreover, the use of high-quality and heavy nonwoven fabrics for a disposable product is becoming increasingly critical for ecological reasons.

Biodegradable filter bags as proposed in EP 2 301 404 and WO 2011/047764 seems not to be a promising approach for improving ecological properties, as filter bags are often disposed of via waste incineration, and composting is out of the question simply because of the primarily non-biodegradable absorbent material.

Nonwoven fabric filter bags for vacuum cleaners today always consist of several layers (EP 1 198 280, EP 2 433 695, EP 1 254 693). Support layers are used to achieve the necessary mechanical strength, coarse filter layers that have a high storage capacity for dust without overly increasing air resistance and the fine filter layers for particle filtration<1 µm.

To increase dust storage capacity, diffusers and partitions have also been used in filter bags for some years to optimize flow conditions in the filter bag, thereby increasing the service life.

To manufacture these different materials, the most diverse technologies are used. Meltblown microfiber nonwoven fabrics are usually used as the fine filter layer. These meltblown nonwoven fabrics are extrusion nonwoven fabrics, mostly made of polypropylene and have filament diameters ranging from less than 1 µm to a few µm. In order to achieve high separation efficiency, these materials are electrostatically charged (e.g. by means of corona discharge). To further improve the separation efficiency, it was proposed to apply nanofibers produced in the electrospinning process to nonwoven substrate materials (DE 199 19 809).

Staple fiber nonwoven fabrics, extrusion nonwoven fabrics [and] also nonwoven fabrics (EP 1 795 247) made of staple fibers or filaments are used for the capacity level. Polypropylene or polyester, [and] also fluff pulp (EP 0 960 645, EP 1 198 280) are usually used as materials for the capacity layers.

The use of recycled plastics (e.g. recycled polyethylene terephthalate (rPET)) for fabrics was proposed in WO 2013/106392. The use of fibers obtained from textile waste is known in US 2009/0223190. To obtain a self-supporting layer from these fibers, after depositing, they are impregnated with adhesive, the excess of which is removed by means of pressurization.

The use of rPET as a raw material for meltblown nonwoven fabrics was already investigated (*Handbook of Nonwovens*, Woodhead Publishing Ltd., edited by S. J. Russell, chapter 4.10.1).

CN101747596 describes the use of recycled PET or recycled PBT (rPET/rPBT) as material for microfilaments.

On this basis, it is therefore the object of the present invention to provide vacuum cleaner filter bags which are in no way inferior to the vacuum cleaner filter bags on the market in terms of dust separation efficiency and service life, and thus have excellent performance characteristics, but consist mainly of recycled materials or waste materials. In particular, it is therefore the object of the present invention to realize vacuum cleaner filter bags that are particularly advantageous ecologically and economically. Preferably, it is intended to realize a percentage of at least 40% of recycled materials in the filter bag.

The object is solved by the vacuum cleaner filter bag according to claim 1. The dependent claims describe advantageous embodiments. With claim 17, the use of a specific nonwoven fabric for vacuum cleaner filter bags is protected.

Thus, the present invention relates to a vacuum cleaner filter bag, which comprises a wall of an air-permeable material enclosing an interior. An inlet opening is provided in the air-permeable material. The vacuum cleaner filter bag according to the invention is characterized in that the air-permeable material comprises at least one layer of a nonwoven fabric which comprises powdery and/or fibrous recycled material from textile manufacturing, in particular cotton textiles, and/or from wool shearing and/or seed fibers.

The at least one layer of nonwoven fabric, comprises powdery and/or fibrous recycled material having a density of 0.005 g/cm$^3$ to 0.03 g/cm$^3$, in particular of 0.007 g/cm$^3$ to 0.02 g/cm$^3$.

The powdery and/or fibrous recycled material from textile manufacturing is important, in particular for processing textile materials (in particular textile fibers and filaments, as well as linear, flat and three-dimensional textile structures produced therewith), such as the manufacturing (comprising carding, spinning, cutting and drying) or recycling textile materials. These powdery and/or fibrous materials are waste materials that can settle on the machines or filter materials used to process the textiles. The powders (or powdery particles) and fibers are normally disposed of and thermally recycled.

Thus, for example, the powdery and/or fibrous recycled material is production waste; this applies in particular to material obtained as a waste product in the process of carding, spinning, cutting or drying textile materials. Typical examples are filament and thread remnants from the spinning mill, edge strips from surface production and complete patches. Such textile waste are described in more detail in *Vliesstoffe: Rohstoffe, Herstellung, Anwendung, Eigenschaften, Prüfung* (English: "Nonwoven Fabrics: Raw Materials, Manufacture, Applications, Characteristics, Testing Processes"; hereafter referred to as "Nonwoven Fabric Handbook"), H. Fuchs, W. Albrecht, et al., ed., 2. Edition 2012, Wiley-VCH Verlag. This is also referred to as "preconsumer waste".

The recycling of textile materials, i.e. the processing (e.g. shredding) of used textile materials or textiles (e.g. old clothes), also yields powdery and/or fibrous recycled material; this is referred to as "post-consumer waste".

Thus, the powdery and/or fibrous recycled material from textile manufacturing comprises in particular fibers obtained from waste materials from the textile and clothing industry, from post-consumer waste (textiles and the like) and from products collected for recycling.

Sheep shearing for wool manufacturing generates short wool fibers as a waste product, which represents a further variant of a powdery and/or fibrous recycled material according to the invention.

The density $\rho_{roh}=m/(V_{fest}+V_{por})$ (also referred to as "bulk density") of a solid (here the nonwoven fabric) is understood to mean the density of the solid relative to the total volume including the pore spaces, wherein m is the mass of the solid, $V_{fest}$ the volume of the material content (in the case of the nonwoven fabric, in particular of the fibers or filaments) and $V_{por}$ denotes the pore volume. The total volume including the pore spaces $(V_{fest}+V_{por})$ is obtained as the product of the thickness and the area of the solid in question, for example, of the nonwoven fabric. Therefore, the thickness of the nonwoven fabric is determined here and in the following, in accordance with DIN EN ISO 9073-2: 1996, Section 5.2 ("Voluminous nonwoven fabrics with a thickness of up to 20 mm"). The area is obtained by measuring the length and width. The mass is weighed.

Surprisingly, it has been proven that a nonwoven fabric has an exceptionally high dust storage capacity, in particular from the recycled material in the aforementioned density range. It is therefore particularly suitable for use as a capacity layer in a vacuum cleaner filter bag.

The powdery and/or fibrous recycled material can be cotton dust and/or tear fibers. The seed fibers can be cotton linters or kapok fibers.

Tear fibers are textile fibers in the second processing cycle, as described in chapter 1.3 of the Nonwoven Fabrics Handbook. They are obtained by means of the tearing process of the textile material, in particular textile waste, as described in chapter 1.3.2. These are used to recycle individual textile fibers. In the tearing process, in particular coarsely pre-comminuted materials are fed through a shredding machine or shredder (tearing tambour) to dissolve the structure. In addition to the tambour described therein, the material can be further fed through a hammer mill as part of the structural resolution process.

Cotton linters are short cotton fibers that stick to the cotton seed core after the long seed hair (cotton) has been removed from the core. Cotton linters, [which] are very different in fiber length (typically 1 to 6 mm) and purity, cannot be spun. In the textile industry, they usually represent a non-recyclable residue and thus a waste product. One can distinguish between First Cut (FC-Linters), Second Cut (SC-Linters) and Mill Run. Linters can be cleaned and bleached to obtain Cotton Linters Cellulose (CLC). Cotton linters can also be used for nonwoven fabrics utilizable in air-permeable materials for the vacuum cleaner filter bags according to the invention. In particular, uncleaned and unbleached FC and/or SC linters can be used.

In the nonwoven fabric layer, which is contained in the air-permeable material, the powdery and/or fibrous recycled material or the seed fibers (in particular cotton linters) are bonded. In this respect, the nonwoven fabric material has undergone a bonding step. Bonding the powdery and/or fibrous recycled material and/or the seed fibers is preferably achieved by adding bonding fibers to the nonwoven fabric layer, which can be, for example, thermally activated (thermofusion).

Therefore, the production of a corresponding nonwoven fabric layer can be achieved by depositing the powdery and/or fibrous recycled material and/or the seed fibers together with the fibers in an aerodynamic process and subsequently bonding to the finished nonwoven fabric by thermal activation of the bonding fibers. Microfibers can also be added before bonding to the finished nonwoven fabric. The proportion of microfibers can be less than 10%. Microfibers are particularly fine and short staple fibers, for example, with a length of less than 2 mm and a diameter of less than 3 µm. In particular, these can be microdenier PET staple fibers. Such fibers are available, for example, under the name Cyphrex from EASTMAN. The grade Cyphrex 10001, for example, has a diameter of about 2.5 µm with a length of 1.5 mm. These or similar microdenier PET staple fibers can further favorably influence or improve pore size.

Aerodynamic processes are dry processes, as described and defined in Section 4.1.3 of the Manual *Vliesstoffe* (English: "Nonwoven Fabrics") H. Fuchs, W. Albrecht, W. Kittelmann, eds., Wiley-VCH, 2nd edition 2012. This section is included here for reference. The deposit of the powdery and/or fibrous recycled material and/or the seed fibers together with the bonding fibers can be carried out, in particular by means of the airlay or airlaid process.

In a preferred embodiment, the layer of nonwoven fabric is provided comprising at least one powdery and/or fibrous recycled material and/or cotton linters comprising or consisting of up to 95 wt. %, preferably 60 to 90 wt. % of the powdery and/or fibrous recycled material and/or cotton linters and at least 5 wt. %, preferably 10 to 40 wt. %, of bonding fibers, in particular bicomponent fibers.

The use of bonding fibers enables the nonwoven fabric to be welded (by means of ultrasound welding). This allows the nonwoven fabric to be efficiently and reliably assembled into a vacuum cleaner filter bag.

The bonding fibers can, for example, be so-called "fusing fibers", which are made of thermoplastic, fusible materials. These fusing fibers melt during thermal activation and bond the powdery and/or fibrous recycled material or seed fibers.

Another advantage here is that the bicomponent fibers preferably used as bonding fibers consist of a core consisting of a first thermoplastic material and a sheath consisting of a second thermoplastic material which melts at lower temperatures than the first thermoplastic material, with the core or both the core and the sheath preferably consisting of a recycled plastic or several recycled plastics. The core can be made of, for example, recycled polyethylene terephthalate (rPET) or recycled polypropylene (rPP). The sheath can be made of a pure/fresh (virgin) plastic, for example pure PP ("virgin PP", i.e. not recycled) or polymethylpentene (PMP). In addition to the core/sheath bi-component fibers, the other common variants of bicomponent fibers (e.g. side by side) can also be considered.

The fusing fibers or bicomponent fibers preferably used as bonding fibers can consist partly or completely of recycled plastics, such as rPET or rPP. The bonding fibers can be crimped or smooth. The crimped bonding fibers can be mechanically crimped or self-crimping (e.g. in the form of bicomponent fibers with an eccentric cross-section).

In a preferred embodiment, the bonding fibers are staple fibers, in particular with a length of 1 to 100 mm, preferably 2 to 40 mm. The fiber length can be determined according to DIN 53808-1:2003-01.

For the purposes of this present invention, for example, a nonwoven fabric, as described in WO 2011/057641 A1, can be used. All embodiments of the present patent application are adopted for the purposes of present invention. The disclosure of this document will therefore also be the subject matter of the present application.

In a further preferred embodiment, the air-permeable material is constructed in several layers, the air-permeable material having, in addition to the at least one layer of nonwoven fabric which comprises powdery and/or fibrous recycled material and/or seed fibers, at least one further layer which comprises or is made of a nonwoven fabric and/or a fiber web, wherein in particular at least one, several or all of the additional layers comprise one or several recycled plastics or are made thereof.

The term "recycled plastic", which is used for the purposes of the present invention, is to be understood as being synonymous with plastic recyclates. For the conceptual definition, reference is made to the standard DIN EN 15347:2007.

Thus, least one of these layers is preferably a nonwoven fabric or a fiber web that comprises recycled plastics and made of in particular recycled plastics. In contrast to the vacuum cleaner filter bags known from the state of the art, little or no fresh (virgin) plastic material is used to produce the wall of the vacuum cleaner filter bag's underlying nonwoven fabrics or fiber webs. Instead, plastics are predominantly or exclusively used, which have already been in use and have been recovered by appropriate recycling processes. Such filter bags are clearly advantageous from an ecological point of view, as they can be produced in a highly raw material-neutral manner. These filter bags also offer economic advantages, as most recycled plastic materials can be purchased at significantly lower prices than the corresponding raw materials that are not recycled ("virgin" plastics).

For the purposes of the present invention, a nonwoven fabric is a randomly laid web structure that has undergone a bonding step, whereby it has sufficient strength, for example, to be wound or unwound into rolls by machine (i.e. on an industrial scale). The minimum web tension required for winding is 0.25 PLI or 0.044 N/mm. The web tension should not exceed 10% to 25% of the minimum maximum tensile force (according to DIN EN 29073-3:1992-08) of the material to be wound. This results in a minimum maximum tensile force for a wound material of 8.8 N per 5 cm strip width.

A fiber web corresponds to a randomly laid web structure, which, however, has not undergone any solidification step, such that unlike a nonwoven fabric, such a randomly laid web structure does not have sufficient strength, for example, to be wound or unwound into rolls by machine. With regard to the definition of this terminology, reference is made to EP 1 795 427 A1, the disclosure of which is also the subject matter of the present patent application.

According to a preferred embodiment, the fibers of the nonwoven fabric or the fiber web contained in the air-permeable material of the wall of the vacuum cleaner filter bag, according to the invention, are made of a single recycled plastic material.

Alternatively, however, it is also preferred if the fibers of the nonwoven fabric or the fiber web are made of different materials, at least one of which is a recycled plastic. Two types in particular are conceivable here:

On the one hand, it can be a mixture of at least two fiber types, for example, fiber mixtures made of at least two different recycled plastics.

On the other hand, it is also possible that the fiber web or the nonwoven fabric contains or is made of bicomponent fibers (BiCo-fibers), which consists of a core and a sheath enclosing the core. The core and mantle are made of different materials. The bicomponent fibers can be in the form of staple fibers or as extrusion nonwoven fabrics (e.g. made of meltblown nonwoven fabrics), wherein the bicomponent fibers theoretically exhibit an infinite length and constitute so-called filaments. With such bicomponent fibers, it is advantageous if at least the core is made of a recycled plastic; for the sheath, for example, a virgin plastic, but alternatively another recycled plastic can also be used.

For the nonwoven fabrics or fiber webs for the purposes of the present invention, it is possible that these are dry-laid, wet-laid or extrusion nonwoven fabrics or extrusion fiber webs. As a result, the fibers of nonwoven fabrics or fiber webs can exhibit finite length (staple fibers), or theoretically infinite length (filaments).

The present invention provides in particular a vacuum cleaner filter bag with a wall of air-permeable material, wherein the material comprises a capacity layer and a fine filter layer,
  wherein the capacity layer is a nonwoven fabric obtained by means of an aerodynamic process comprising powdery and/or fibrous recycled material from textile manufacturing, in particular cotton textiles, and/or from wool shearing and/or seed fibers, and
  wherein the fine filter layer is a meltblown nonwoven fabric of virgin PP, in particular electrostatically charged, or a meltblown nonwoven fabric of bicomponent fibers having an rPET or rPP core and a sheath of virgin PP or virgin PMP, or a substrate layer of recycled plastic fibers having a layer of nanofibers applied thereto.

Therefore, the capacity layer can correspond to the nonwoven fabric layer already described above. In particular, the nonwoven fabric of the capacity layer can be strengthened by thermally activated bonding fibers, for example, bicomponent fibers. In particular, the nonwoven fabric of the capacity layer can be strengthened by thermally activated bonding fibers, for example, bicomponent fibers. The capacity layer may consist of powdery and/or fibrous recycled material and/or seed fibers, on the one hand, and thermally activated bonding fibers (e.g. comprising a core and/or sheath of recycled plastic as described above), on the other hand; in this case the capacity layer does not contain any further fibers or bonding agents.

The term "nanofiber" is used according to the terminology of DIN SPEC 1121:2010-02 (CEN ISO/TS 27687:2009).

The fine filter layer can be arranged in the direction of air flow (from the dirty air side to the clean air side) behind the capacity layer.

Optionally, the vacuum cleaner filter bag can have a(n) (additional) reinforcement layer or support layer in the form of a dried nonwoven fabric layer or in the form of an extrusion nonwoven fabric layer. The dried nonwoven fabric layer may comprise—as described above—powdery or fibrous recycled material from textile manufacturing, in particular cotton textiles, and/or from wool shearing and/or seed fibers; alternatively the dried nonwoven fabric layer may comprise staple fibers of recycled plastic, in particular rPET or rPP. The extrusion nonwoven fabric layer can comprise monocomponent or bicomponent filaments of recycled plastic, in particular rPET or rPP.

The reinforcement layer can be located behind the fine filter layer in the direction of air flow.

Altogether, the construction of the wall of the filter bag can be designed according to the present invention, as described in EP 1 795 247. Thus, such a wall comprises at least three layers, wherein at least two layers consist of at least one nonwoven fabric layer and at least one fiber web layer containing staple fibers and/or filaments. The wall of the vacuum cleaner filter bag is therefore additionally characterized by a welded joint, wherein all layers of the filter material are joined together by welded joints. The pressing area of the welding pattern is a maximum of 5% of the surface of the flowable area of the filter material or vacuum cleaner filter bag. Concerning the total flowable area of the filter bag, there are on average a maximum of 19 welded joints per 10 $cm^2$.

For example, the air-permeable material can be designed as described in the introductory part of the present patent application, e.g. as described in EP 1 198 280, EP 2 433 695, EP 1 254 693, DE 199 19 809, EP 1 795 247, WO 2013/106 392 or CN 101747596, as long as powdery and/or fibrous recycled material from textile manufacturing and/or from wool shearing and/or seed fibers was used for the production of these filter materials. With regard to the detailed structure of these filter materials, reference is made to the disclosures of these publications, which in this respect, must also be included in the disclosure of the present invention.

The present invention covers several particularly preferred possibilities for the multi-layer embodiment of the air-permeable material, which are presented below. The majority of these layers can be welded together, in particular as described in EP 1 795 427 A1. The layers can also be glued together or bonded as described in WO 01/003802.

With the aforementioned multi-layer structure of the air-permeable material, the following embodiments are particularly advantageous.

According to an embodiment, the air-permeable material has at least one support layer and at least one capacity layer, at least one or all of the support layers being nonwoven fabrics and/or at least one or all of the capacity layers being nonwoven fabrics or fiber webs comprising or made of one recycled plastic or several recycled plastics.

Alternatively, it is also possible for the air-permeable material to have at least one support layer, at least one fine filter layer and at least one capacity layer, wherein at least one or all of the support layers and/or at least one or all of the fine filter layers are nonwoven fabrics comprising or made of one recycled plastic or several recycled plastics, and/or at least one or all of the capacity layers are nonwoven fabrics or fiber webs comprising or made of one recycled plastic or several recycled plastics.

In one embodiment, the air-permeable material can have at least one support layer, at least one fine filter layer and at least one capacity layer, wherein at least one, preferably all, of the capacity layers comprise or are made of the nonwoven fabric, which is characterized in greater detail above, and which comprises or is made of powdery and/or fibrous recycled material and/or seed fibers. Due to the nonwoven fabric web bonding, the nonwoven fabric layer, which is designed as a capacity layer, exhibits such a high mechanical strength that it can also function as a support layer.

It is also possible to make the outer layer on the clean air side out of a relatively thin material based on cotton dust.

The individual layers are described in more detail according to their function.

A support layer (also sometimes called "reinforcement layer"), in the sense of the present invention, is a layer that gives the multi-layer composite of the filter material the necessary mechanical strength. This is an open, powdery nonwoven fabric or a nonwoven fabric with a light basis weight. A support layer is used, among other things, to support other layers or layers and/or to protect them from abrasion. The support layer can also filter the largest particles. The support layer, like any other layer of filter material, may also be electrostatically charged, provided that the material has suitable dielectric properties.

A capacity layer offers high resistance to shock loads, filtering large dirt particles, filtering a significant proportion of small dust particles, storage or retention of large quantities of particles, allowing the air to flow easily, resulting in a low-pressure drop with high particle loading. This has a particular effect on the service life of a vacuum cleaner filter bag.

A fine filter layer serves to increase the filtration performance of the multi-layer filter material by trapping particles that pass through, for example, the support layer and/or the capacity layer. To further increase the separation efficiency, the fine filter layer can be preferably charged electrostatically (e.g. by corona discharge or hydrocharging) in order to increase in particular the separation of fine dust particles.

WO 01/003802 provides an overview of the individual functional layers within the multi-layer filter materials for vacuum cleaner filter bags. The air-permeable material of the wall of the vacuum cleaner filter bag, according to the invention, can, for example, be constructed as in this patent document provided that at least one of the layers of the multi-layer filter material for the vacuum cleaner filter bag described therein is made of one recycled plastics or several recycled plastics. The disclosure of WO 01/003802 is also included in the present application with regard to the structure of the air-permeable filter materials.

Particular embodiments of the aforementioned aspects of the present invention provide that each support layer is a spunbond nonwoven fabric or scrim, preferably with a grammage of 5 to 80 $g/m^2$, further preferably of 10 to 50 $g/m^2$, further preferably of 15 to 30 $g/m^2$ and/or preferably with a titer of the fibers forming the spunbond or scrim in the range of 0.5 dtex to 15 dtex.

The air-permeable material preferably has one to three support layers.

In the case of at least two support layers, it is preferred that the total grammage of the sum of all support layers is 10 to 240 $g/m^2$, preferably 15 to 150 $g/m^2$, further preferably 20 to $g/m^2$, further preferably 30 to 90 $g/m^2$, in particular 40 to 70 $g/m^2$.

Alternatively or in addition to the aforementioned embodiments, it is also possible that all support layers are made of one recycled plastic or several recycled plastics, in particular rPET and/or rPP.

With the aforementioned fine filter layers, it is advantageous if each fine filter layer is an extruded nonwoven fabric, in particular a meltblown nonwoven fabric, preferably with a grammage of 5 to 100 $g/m^2$, preferably 10 to 50 $g/m^2$, in particular 10 to 30 $g/m^2$.

The air-permeable material for the purpose of the vacuum cleaner filter bag, according to the present invention, can advantageously comprise one to five fine filter layers.

If at least two fine filter layers are present, the total grammage of the sum of all fine filter layers can be 10 to 300 $g/m^2$, preferably 15 to 150 $g/m^2$, in particular 20 to 50 $g/m^2$.

All fine filter layers are preferably made of one recycled plastic or several recycled plastics, in particular rPET and/or rPP.

Particularly preferred fine filter layers are meltblown nonwoven fabrics, which can be made of, in particular rPET. The rPET used can be unmetallized or metallized. Therefore, the rPET can be derived from, for example, bottle flake chips or metallized PET films. It is also possible that the meltblown nonwoven fabrics are bicomponent meltblown nonwoven fabrics. In this respect, it is particularly advantageous if the core of such a bicomponent fiber consists of rPET, whereby this core material is coated with another thermoplastic material, for example, polypropylene.

Alternatively or in addition to the aforementioned embodiments, it is also possible and in particular preferred if at least one, preferably all fine filter layers are electrostatically charged. This requires that at least the surface of the fibers to be charged be made of a dielectric material. In case metallized PET recyclate is used, this embodiment is then only possible with the aforementioned bicomponent fibers, in which the metallized rPET forms the core of the In the aforementioned capacity layers, it is particularly advantageous if at least one, preferably each capacity layer is a nonwoven fabric comprising powdery and/or fibrous recycled material from textile manufacturing, in particular cotton textiles, and/or from wool shearing and/or seed fibers, whereby each capacity layer preferably has a grammage of 5 to 200 $g/m^2$, further preferably 10 to 150 $g/m^2$, further preferably 20 to 100 $g/m^2$, in particular 30 to 50 $g/m^2$.

The air-permeable material preferably has one to five capacity layers.

If at least two capacity layers are present, the total grammage of the sum of all capacity layers can be 10 to 300 $g/m^2$, preferably 15 to 200 $g/m^2$, preferably 20 to 100 $g/m^2$, in particular 50 to 90 $g/m^2$.

A particularly preferred embodiment includes the following multi-layer variants of the air-permeable material, with a layer sequence seen from the interior of the vacuum cleaner filter bag:

a support layer; at least one, preferably at least two, capacity layers; preferably a further support layer; at least one, preferably at least two, fine filter layers; and a further support layer. If the capacity layer exhibits a high mechanical strength, as described above, the innermost capacity layer can also be dispensed with.

One or two capacity layers, one or two fine filter layers (meltblown layers), a support layer (spunbond nonwoven fabric or web).

The support layers and/or capacity layers can be made of a nonwoven fabric material, which comprises powdery and/or fibrous recycled material from textile manufacturing, in particular cotton textiles and/or seed fibers.

In a particularly preferred embodiment, the nonwoven fabric material forms the at least one capacity layer, while the other layers comprise no powdery and/or fibrous recycled material from textile manufacturing, in particular cotton textiles and/or wool shearing and/or seed fibers.

All the layers of the aforementioned embodiments can be joined together by means of welded joints, as described in particular in EP 1 795 427 A1. However, welded joints are not absolutely necessary.

A further advantage is that the vacuum cleaner filter bag features a retaining plate enclosing the inlet opening, which is made of one or several recycled plastics or comprises one or more recycled plastics. In particular, the retaining plate is made of rPET or comprises a very high proportion of rPET, for example, at least 90 wt. %. According to this preferred embodiment, it is thus further possible to increase the proportion of recycled plastics in the vacuum cleaner filter bag.

According to a further preferred embodiment, it is provided that at least one flow distributor and/or one diffuser are arranged in the interior, wherein preferably the at least one flow distributor and/or the at least one diffuser is made of a recycled plastic or several recycled plastics or from a nonwoven fabric material which comprises powdery and/or fibrous recycled material from textile manufacturing, in particular cotton textiles and/or seed fibers. Such flow distributors or diffusers are, e.g. known in patent applications EP 2 263 508, EP 2 442 703, DE 20 2006 020 047, DE 20 2008 003 248, DE 20 2008 005 050.

Thus, the flow distributors and diffusers are likewise preferably made of nonwoven fabric or laminates of nonwoven fabrics. For these elements, the same materials, such as for the capacity and reinforcing layers, would preferably be suitable.

The recycled plastic, which can be used in special nonwoven fabric materials or in retaining plates for vacuum cleaner filter bags, is preferably selected from the group consisting of recycled polyesters, in particular recycled polyethylene terephthalate (rPET), recycled polybutylene terephthalate (rPBT), recycled polylactic acid (rPLA), recycled polyglycolide and/or recycled polycaprolactone; recycled polyolefins, in particular recycled polypropylene (rPP), recycled polyethylene and/or recycled polystyrene (rPS); recycled polyvinyl chloride (rPVC), recycled polyamides as well as mixtures and combinations thereof.

Relevant international standards exist for many plastic recyclates. For PET plastic recyclates, DIN EN 15353:2007 is, for example, relevant. PS recyclates are described in more detail in DIN EN 15342:2008. PP Recyclates are characterized in DIN EN 15345:2008. PVC recyclates are specified in more detail in DIN EN 15346:2015. For the purpose of corresponding particular plastic recyclates, the present patent application adopts the definitions of these international standards. The plastic recyclates can thereby be unmetallized. An example of this can be plastic flakes or plastic chips recycled from PET beverage bottles. Likewise the plastic recyclates can be metalized, e.g. if the recyclates are obtained from plastic films, in particular metallized PET films (MPET).

The recycled plastic is, in particular, recycled polyethylene (rPET), which was obtained from beverage bottles, in particular, so-called bottle flakes, i.e. pieces of grounded beverage bottles.

The recycled plastics, in particular the recycled PET, in both metallized and non-metallized forms, can be spun to the corresponding fibers, from which the corresponding staple fibers or meltblown nonwoven fabrics or spunbond nonwoven fabrics can be made for the purposes of the present invention.

A particularly preferred embodiment provides that the total weight of the seed fibers and any recycled materials present relative to the total weight of the vacuum cleaner filter bag, is at least 25%, preferably at least 30%, further preferably at least 40%, further preferably at least 50%, further preferably at least 60%, further preferably at least 70%, further preferably at least 80%, further preferably at least 90%, in particular at least 95%. Thus, the requirements of the Global Recycled Standard (GRS), v3 (August 2014) of Textile Exchange can be fulfilled.

The vacuum cleaner filter bag according to the present invention can take the form of a flat bag, a side-gusseted bag, a block bottom bag or a 3D bag, such as a vacuum cleaner filter bag for an upright vacuum cleaner. A flat bag has no sidewalls and is made of two layers of material, whereby the two layers of material are directly connected along their circumference, for instance, welded or glued. Side-gusseted bags represent a modified form of a flat bag and comprise fixed or eversible side gussets. Block bottom bags comprise a so-called block or block bottom, which usually forms the narrow side of the vacuum cleaner filter bag; a retaining plate is usually arranged on this side.

The invention also provides the use of nonwoven fabrics containing powdery and/or fibrous recycled material from textile manufacturing, in particular cotton textiles, and/or wool shearing and/or seed fibers, for vacuum cleaner filter bags. With regard to the particular embodiment of such nonwoven fabrics, reference is made to the preceding embodiments.

The present invention will be explained in more detail with reference to the following exemplary embodiments and the figure, without restricting the invention to the particular embodiments shown. Thereby showing:

FIG. 1 Comparative measurements of the volume flow for two variants of vacuum cleaner filter bags.

Filter bags are designed, which comprise one or several layers of an aerodynamically formed nonwoven fabric, for example, an airlay nonwoven fabric or an airlaid nonwoven fabric. In addition, the filter bags according to the invention described below may have one or several layers of rPET or rPP filaments or rPET or rPP staple fibers or be made of cotton dust, seed fibers or wool fibers from shearing waste and bicomponent fibers. The different nonwoven fabrics are only suitable for certain material layers. In order to further increase the proportion of recycled raw materials, a retaining plate made of rPET or rPP or at least with rPET or rPP can also be used.

With regard to the individual fine filter layers:

Spunbond nonwoven fabric layers made of rPET or rPP with a basis weight of 5 to 50 g/m² and a titer of 1 dtex to 15 dtex are particularly suitable as support layers. PET waste (e.g. chads or punching waste) and bottle flakes, i.e. pieces of ground beverage bottles, are used as raw materials. In order to overlay the different colors of the waste material, it is possible to color the recycled material. The HELIX® (Comerio Ercole) process is particularly advantageous as a thermal bonding process for solidifying spunbond nonwoven fabric into a spunbond.

One or more meltblown nonwoven fabric layers of rPET or rPP with a basis weight of 5 to 30 g/m² each are used as fine filter layers. In addition, one or more meltblown nonwoven fabric layers of virgin PP can be available. At least this layer/these layers is/are electrostatically charged by a corona discharge. The layers of rPET or rPP can also be electrostatically charged. At the same time, it should be only noted that no metallized PET waste should then be used for production. Alternatively, meltblown filaments can also consist of bicomponent fibers, in which the core is made of rPET or rPP, and the sheath from a plastic, which can be electrostatically charged particularly well (e.g. virgin PP, PC, PET).

One or more capacity layers contain rPET or rPP staple fibers or rPET or rPP filaments or are produced on the basis of cotton dust and bicomponent fibers. Different processes are suitable for the production of capacity layers. Usually carding processes, airlay processes or airlaid processes are applied, in which staple fibers are first deposited, which are then usually bonded to a nonwoven fabric material in a nonwoven fabric bonding step (e.g. by needling, hydroentangling, ultrasonic calendering, by means of thermal bonding in the through-flow furnace also using bicomponent fibers or bonding fibers, or by chemical bonding, for example, with latex, hot melt, foam binders, etc.). The HELIX® (Comerio Ercole) process is particularly advantageous for calendering.

A process is also used in which the primary fiber web is not strengthened, but rather bonded to a nonwoven fabric with as few welds as possible. However, this process is not suitable for the variant made of cotton dust. In both processes, it is possible to use staple fibers made of rPET or rPP. Capacity layers can also be produced as extrusion nonwoven fabrics or extrusion fiber webs. For these nonwoven fabrics, rPET or rPP can also be used without any problems.

The filaments or staple fibers can also consist of bicomponent materials, in which the core is made of rPET or rPP, and the sheath is made of a plastic that can be electrostatically charged particularly well (e.g. virgin PP, PC, PET).

Alternatively or additionally, one or more layers of an aerodynamically formed nonwoven fabric can be present, which is made of bicomponent fibers and cotton dust or seed fibers (e.g. cotton linters).

The basis weight of the individual capacity layers lies preferably between 10 and 100 g/m².

The differently produced capacity layer can of course also be combined with each other.

In order to further increase the proportion of recycled material, a retaining plate made of rPET can be used. If the seal to the vacuum cleaner nozzle is taken over by the bag material, the retaining plate can consist exclusively of rPET or rPP. If the retaining plate has to assume the sealing function, a TPE seal can be injection-molded or glued on.

By making use of all the possibilities, a proportion of recyclates or waste materials of up to 96% is possible. The following tables give some concrete embodiments with a recyclate content of 61% to 89%.

From the various recycled nonwoven fabrics or fiber webs, the vacuum cleaner filter bags shown below have been designed using the specified materials, the exact composition or structure of which is given in the following tables. The vacuum cleaner filter bags are flat bags of rectangular geometry having the dimension of 300 mm×280 mm.

EXAMPLE 1

|  | Grammage [g/m²] | Weight per bag [g] | Recyclate content [%] |
| --- | --- | --- | --- |
| Outer support layers | 25 | 4.2 | 100 |
| Meltblown | 15 | 2.5 | 0 |
| Meltblown | 15 | 2.5 | 0 |
| Middle support layer | 17 | 2.9 | 100 |
| Capacity layer C | 35 | 5.9 | 80 |
| Capacity layer D | 35 | 5.9 | 80 |
| Inner support layer | 15 | 2.5 | 100 |
| Retaining plate |  | 5.0 | 0 |
| Total filter bag |  | 31.4 | 60.5 |

The vacuum cleaner filter bag according to Example 1 is also made of a 7-layer air-permeable material. A support layer (outer) is arranged on the clean air side, to which two fine filter layers (meltblown made of virgin PP) are attached in the direction of the interior. Both meltblown layers are enclosed by an additional support layer. Attached thereto are two capacity layers C and D, which are finally enclosed by a support layer on the dirty air side (inside). The capacity layers C and D is made of a nonwoven fabric material, 80 wt. % of which is made of cotton dust or seed fibers and 20% of BiCo bonding fibers. This nonwoven fabric material is described in detail in WO 2011/057641 A1. The cotton dust or seed fiber content in the capacity layers is added to the total recyclate content.

With such an embodiment, a proportion of recycled material, i.e. the sum of recycled plastics, as well as cotton dust or seed fibers of 60.5 wt. %, is achieved relative to the entire vacuum cleaner filter bag.

EXAMPLE 2

|  | Grammage [g/m²] | Weight per bag [g] | Recyclate content [%] |
|---|---|---|---|
| Outer support layers | 25 | 4.2 | 100 |
| Meltblown | 15 | 2.5 | 0 |
| Meltblown | 15 | 2.5 | 0 |
| Middle support layer | 17 | 2.9 | 100 |
| Capacity layer A | 35 | 5.9 | 100 |
| Capacity layer D | 35 | 5.9 | 80 |
| Inner support layer | 15 | 2.5 | 100 |
| Retaining plate |  | 5.0 | 0 |
| Total filter bag |  | 31.4 | 64.3 |

The vacuum cleaner filter bag according to Example 2 is constructed in the same way as the vacuum cleaner filter bag according to Example 1. The outer capacity layer corresponds to a capacity layer according to Examples 6 to 8, i.e. a carded staple fiber nonwoven fabric consisting of 100% recycled PET fibers. The recycled content of a manufactured vacuum cleaner filter bag is 64.3 wt. %.

EXAMPLE 3

|  | Grammage [g/m2] | Weight per bag [g] | Recyclate content [%] |
|---|---|---|---|
| Outer support layers | 25 | 4.2 | 100 |
| Meltblown | 15 | 2.5 | 0 |
| Meltblown | 15 | 2.5 | 0 |
| Middle support layer | 17 | 2.9 | 100 |
| Capacity layer C | 35 | 5.9 | 80 |
| Capacity layer D | 35 | 5.9 | 80 |
| Inner support layer | 15 | 2.5 | 100 |
| Retaining plate |  | 5.0 | 100 |
| Total filter bag |  | 31.4 | 76.4 |

The vacuum cleaner filter bag in Example 3 corresponds to a vacuum cleaner filter bag in Example 1, with the difference that the retaining plate is made of 100% rPET. The total amount of recycled materials in this vacuum cleaner filter bag is 76.4 wt. %.

EXAMPLE 4

|  | Grammage [g/m2] | Weight per bag [g] | Recyclate content [%] |
|---|---|---|---|
| Outer support layers | 25 | 4.2 | 100 |
| Meltblown | 15 | 2.5 | 80 |
| Meltblown | 15 | 2.5 | 80 |
| Middle support layer | 17 | 2.9 | 100 |
| Capacity layer C | 35 | 5.9 | 80 |
| Capacity layer D | 35 | 5.9 | 80 |
| Inner support layer | 15 | 2.5 | 100 |
| Retaining plate |  | 5.0 | 100 |
| Total filter bag |  | 31.4 | 89.3 |

The vacuum cleaner filter bag in Example 4 corresponds to the vacuum cleaner filter bag in Example 3, with the difference that the two fine filter layers are made of a bicomponent meltblown nonwoven fabric with a core made of rPET and a sheath of polypropylene. The recyclate content of such a vacuum cleaner filter bag is 89.3 wt. %.

To confirm the advantageous effect of using a nonwoven fabric layer of recycled material with a density according to the invention, FIG. 1 shows the comparison of a volume flow measurement of a bag according to the invention with a bag known from the state of the art.

The volume flow was measured with a Miele C3 Ecoline vacuum cleaner at 750 W.

The air data of a vacuum cleaner or motor blower unit are determined in accordance with DIN EN 60312-1:2014-01. In particular, reference is made to Section 5.8. The measuring device in version B in accordance with Section 7.3.7.3 is used. If a door blower unit without vacuum cleaner housing is measured, measuring device B is also used. The versions in Section 7.3.7.1 apply to any intermediate pieces required for connection to the measuring chamber.

The terms "volume flow" and "suction air flow" are also used for the term "air flow" according to DIN EN 60312-1.

The measured bags were manufactured or assembled according to the dimensions of the original Miele dust bag intended for the vacuum cleaner.

The bag according to the invention had the following structure. The outer layer consisted of spunbond nonwoven fabric (25 g/m²), the fine filter layer of a meltblown nonwoven fabric of 28 g/m². This was followed by a reinforcement layer of 17 g/m² spunbond nonwoven fabric. The following capacity layer consisted of tear fibers from textile waste bonded with PET bicomponent fibers. The proportion of bicomponent fibers was 35 wt. %, the proportion of tear fibers 65 wt. %. The capacity layer has a basis weight (grammage) of 74.9 g/m². Their thickness according to DIN EN ISO 9073-2:1996, section 5.2 was 5.29 mm. The density (bulk density) $\rho_{roh}$ was 0.014 g/cm³.

The bag in comparison according to the state of the art was manufactured based on the teaching of EP 0 960 645 (in particular paragraphs [0036] and [0038]) and had the following structure: outer layer spunbond nonwoven fabric 28 g/m², fine filter layer 22 g/m², spunbond nonwoven fabric 17 g/m², airlaid nonwoven fabric 73 g/m², spunbonde nonwoven fabric 17 g/m². The capacity layer consisted of 65 wt. % cellulose fibers (fluff pulp) and 35 wt. % PET bicomponent fibers. It had a basis weight of 73 g/m², a thickness according to DIN EN ISO 9073-2:1996, section 5.2 of 1.05 mm and a density of 0.070 g/cm³.

FIG. 1 shows the result of the corresponding dust loading tests with DMT dust (type 8) according to DIN EN 60312-1:2014-01. It is immediately apparent that the capacity layer in accordance with the invention, which has the comparatively high density, leads to a significantly lower drop in the volume flow. Even a load of 400 g of dust leads to a decrease in the volume flow rate of only 9.1% in the bag according to the invention, whereas the conventional bag shows a decrease of 14.7%.

Thus, this capacity layer leads to a further improved, high suction power even with a filled bag.

The invention claimed is:

1. A vacuum cleaner filter bag, comprises an interior-enclosing wall of an air-permeable material and an inlet opening introduced into the interior-enclosing wall, wherein the air-permeable material comprises at least one layer of a nonwoven fabric comprising powdery or fibrous recycled material from textile manufacturing, wherein the at least one layer of the nonwoven fabric has a density from 0.005 g/cm³ to 0.03 g/cm³, wherein the powdery or fibrous recycled material comprises cotton dust, wherein the at least one layer of the nonwoven fabric comprises at least one powdery or fibrous recycled material comprising up to 95 wt. % of the powdery or fibrous recycled material or seed fibers and at least 5 wt. % of bonding fibers, wherein the at least one layer of the nonwoven fabric is a dry-laid nonwoven fabric, wherein the powdery or fibrous recycled material in the at least one layer of the nonwoven fabric is bonded via the bonding fibers being thermally activated, wherein the air-permeable material comprises, at least one fine filter layer, at least one capacity layer, and optionally at least one support layer, wherein the at least one support layer or the at least one fine filter layer comprises nonwoven fabrics which are made of one or more recycled plastics, and wherein the at least one capacity layer comprises nonwoven fabrics comprising the powdery or fibrous recycled material.

2. The vacuum cleaner filter bag according to claim 1, wherein the bonding fibers have staple fibers with a length of 2 to 75 mm.

3. The vacuum cleaner filter bag according to claim 1, wherein the bonding fibers comprise bicomponent fibers, wherein the bicomponent fibers comprise a core comprising a first thermoplastic material and a sheath comprising a second thermoplastic material which melts at lower temperatures than the first thermoplastic material, and wherein the core comprises the one or more recycled plastics or both the core and the sheath comprise the one or more recycled plastics.

4. The vacuum cleaner filter bag according to claim 1, wherein the air-permeable material is constructed in several layers, the air-permeable material having, in addition to the at least one layer of the nonwoven fabric which comprises the powdery or fibrous recycled material, at least one further layer comprising a nonwoven fabric or a fiber web, and wherein the at least one further layer comprises the one or more recycled plastics.

5. The vacuum cleaner filter bag according to claim 1, wherein
a) each support layer is a spunbond nonwoven fabric or scrim,
b) the air-permeable material comprises 1 to 3 support layers,
in case of at least two support layers, a total grammage of a sum of all the support layers is 10 to 240 g/m², or
c) all support layers are made of the one or more recycled plastics.

6. The vacuum cleaner filter bag according to claim 1, wherein
a) each fine filter layer is an extrusion nonwoven fabric,
b) the air-permeable material comprises 1 to 5 fine filter layers,
c) in case of at least two fine filter layers are present, an overall grammage of a sum of all fine filter layers are 10 to 300 g/m²,
d) at least one fine filter layer is made of the one or more recycled plastics, or e) the at least one fine filter layer is electrostatically charged.

7. The vacuum cleaner filter bag according to claim 1, wherein
a) the at least one capacity layer is a nonwoven fabric comprising the powdery or fibrous recycled material from textile manufacturing,
b) the air-permeable material comprises 1 to 5 capacity layers, or
c) in case of at least two capacity layers are present, an overall gram mage of a sum of all capacity layers is 10 to 300 g/m².

8. The vacuum cleaner filter bag according to claim 1, wherein the air-permeable material is formed in several layers with a layer sequence seen from an interior of the vacuum cleaner filter bag:
a support layer, at least one capacity layer, at least one fine filter layer as well as a further support layer.

9. The vacuum cleaner filter bag according to claim 1, wherein the vacuum cleaner filter bag has a retaining plate enclosing the inlet opening, and wherein the retaining plate comprises the one or more recycled plastics.

10. The vacuum cleaner filter bag according to claim 1, wherein at least one flow distributor or at least one diffuser is arranged in an interior of the vacuum cleaner filter bag.

11. The vacuum cleaner filter bag according to claim 4, wherein the one or more recycled plastics comprises recycled polyesters.

12. The vacuum cleaner filter bag according to claim 1, wherein a weight proportion of all recycled materials relative to a total weight of the vacuum cleaner filter bag is at least 25%.

13. The vacuum cleaner filter bag according to claim 1, wherein the vacuum cleaner filter bag comprises a flat bag, a block bottom bag or a 3D bag.

14. The vacuum cleaner filter bag according to claim 1, wherein the at least one layer of the nonwoven fabric comprising the powdery or fibrous recycled material from textile manufacturing comprises cotton textiles.

15. The vacuum cleaner filter bag according to claim 1, wherein the at least one layer of the nonwoven fabric comprises the powdery or fibrous recycled material that that has the density from 0.007 g/cm³ to 0.02 g/cm³.

16. The vacuum cleaner filter bag according to claim 10, wherein the at least one flow distributor or the at least one diffuser is made of the one or more recycled plastics or another nonwoven fabric comprising another powdery or fibrous recycled material from textile manufacturing.

17. The vacuum cleaner filter bag according to claim 1, wherein
a) each support layer is a spunbond nonwoven fabric or scrim with a grammage of 5 to 80 g/m² or with a titer of the spunbond nonwoven fabric or scrim made of fibers in a range of 0.5 dtex to 15 dtex,
b) the air-permeable material comprises 1 to 3 support layers,
in case of at least two support layers are present, a total grammage of a sum of all the support layers is 10 to 240 g/m²,
or
c) all support layers are made of the one or more recycled plastics comprising rPET.

* * * * *